R. E. GARRETT.
GEAR CUTTING MACHINE.
APPLICATION FILED SEPT. 9, 1918.
1,312,245.
Patented Aug. 5, 1919.
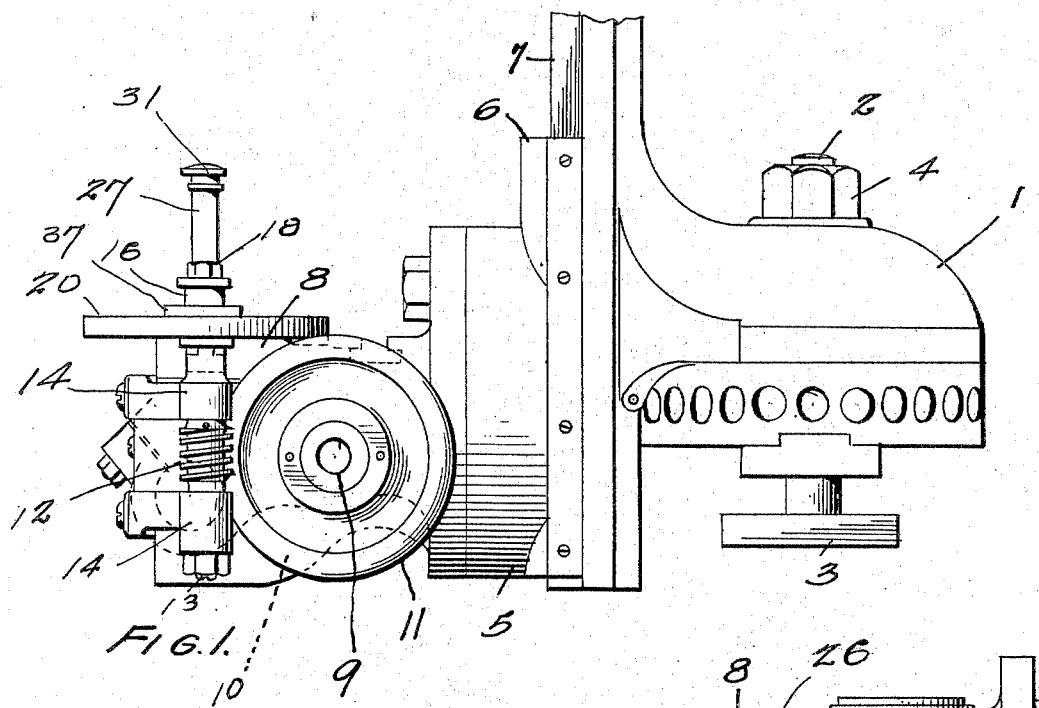
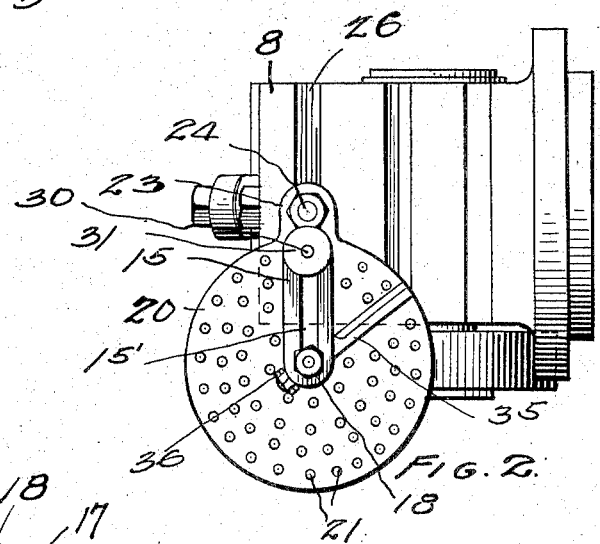
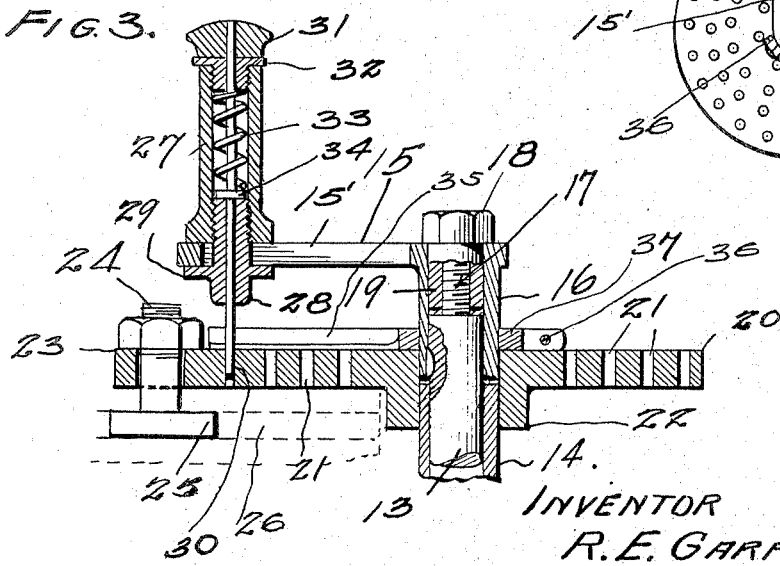
INVENTOR
R. E. GARRETT
Wm. L. Edmonston
Attorney.

UNITED STATES PATENT OFFICE.

ROBERT E. GARRETT, OF NASHVILLE, TENNESSEE.

GEAR-CUTTING MACHINE.

1,312,245.  Specification of Letters Patent.  Patented Aug. 5, 1919.

Original application filed May 10, 1917, Serial No. 167,681. Divided and this application filed September 9, 1918. Serial No. 253,196.

*To all whom it may concern:*

Be it known that I, ROBERT E. GARRETT, a citizen of the United States, residing at Nashville, in the county of Davidson and State of Tennessee, have invented certain new and useful Improvements in Gear-Cutting Machines, of which the following is a specification.

The present invention relates to improvements in indexing devices, and is applicable especially for use in connection with machine or lathe heads for hobbing or cutting worm wheels, spur gears, bevel gears, etc., where the "blank" is required to be turned successively, in order to bring it to position so that the cutting tool may act on the blank to cut the successive teeth in a gear wheel for instance. The device of the present invention is particularly adapted for use in connection with the machine in my copending application for Patent Ser. No. 167,681 filed May 10, 1917, for gear cutting machines.

In the accompanying drawings I have depicted one physical embodiment of my invention, which is filed as a divisional application for patent from the above mentioned patent application, the same being constructed and arranged according to the best mode I have so far devised for the practical application of the principles of the invention in a hand or manually operated indexing device of this character.

Figure 1 is a view in elevation showing sufficient of the machine with which to illustrate the application thereto of the present invention.

Fig. 2 is a top plan view showing the indexing disk and lever.

Fig. 3 is a vertical sectional view showing the relation of the indexing lever to the index disk.

In the preferred embodiment of the invention as depicted in the drawings, the base 1 is secured to the lathe (not shown) through the instrumentality of the bolt 2, its head 3 and the nut 4, and the apron 5 on the slide 6 is vertically adjustable on the plate 7. Upon the apron is secured a slotted or grooved head 8 through which the mandrel 9 passes, and upon the mandrel the "blank" or work is supported and turned, and it is the turning or revolving movement of the mandrel that is indexed by the device of the invention, and which is claimed herein. The mandrel is directly revolved through the instrumentality of a worm gear 10 (shown in dotted lines inside the shield 11) and the worm wheel is turned through the medium of the worm or worm screw 12 on the worm shaft 13.

The worm shaft is vertically disposed and journaled in the bearing sleeves 14, 14 of the head 8, the worm screw 12 being located between the two journal bearings. Mounted upon the worm shaft is a slotted index lever 15 which is fashioned with a depending sleeve 16 and the reduced, threaded extension 17 of the worm shaft projects up into the sleeve, a nut 18 with its threaded sleeve 19 serving to rigidly hold the lever through its sleeve to the shaft through its threaded extension.

The indexing plate 20 is a circular disk of suitable diameter and thickness, and is provided with a number of perforations 21, arranged in concentric series over the upper face of the disk and extending through the disk. Below the disk and centrally thereof is an integral hub 22 which incases, and is revoluble on the bronze bearing sleeve 14 of the shaft 13, and an additional support for the disk is provided in the perforated lug 23 through which the bolt 24 is passed to firmly lock the disk with relation to the head 8. For this purpose, the bolt has a T-head 25 engaging in a groove 26 in the top of the head, and after the disk has been once set in position the bolt holds it in rigid relation with the head 8.

The different series of perforations 21 are spaced apart, and the perforations in each series are spaced apart from each other so that when the index lever is moved the distance between two perforations in the same series, the "work" will be turned the proper distance for cutting another tooth. The index disk is rigid with the sleeve 14 and the head, but the lever is revoluble through its sleeve 16 in the disk and on the upper end of the bronze bearing sleeve.

The index lever is equipped with a hollow post or handle 27 that is clamped to the slotted lever through the instrumentality of the clamp nut 28 which is passed through the slot 15' of the lever from beneath and threaded into the open, lower end of the post or handle, a flange 29 being provided on the nut to make rigid and stable bearing.

The nut is bored centrally to receive the index pointer or stem 30, passing therethrough and projecting below the index lever in order that it may be inserted in the perforations in the index plate, and at its upper end, above the top of the post, a cap 31 is fixed to the stem. A guide nut 32 is threaded into the upper open end of the post and this nut is also centrally bored to accommodate the stem which passes therethrough and is guided in the nut. Within the hollow post a protractile spring 33 is coiled about the stem having its upper end bearing against the under side of the guide nut, and its lower end bears against the upper face of a collar 34 fixed on the stem.

Thus when it is desired to revolve the work for a successive cut, the stem is withdrawn from the perforated disk by pulling up on the cap of the stem, against the tension of the spring in the post, and when the stem or pointer has been withdrawn from the perforation the lever may be turned the distance between two perforations, and the stem or pointer is then permitted to be projected into the perforation.

A guide tool for the plate or disk is shown at 35, which has a hub 37 that may be clamped about the sleeve of the lever by the screw 36. The friction however between the guide and the sleeve is not sufficient to cause the guide to turn with the lever, for the guide is set ahead of the stem to register with a certain perforation in the series, and then the lever is moved up to this point as a guide.

It will be evident that the pointer may be inserted in the perforations of the four circles shown, depending upon the number of teeth to be cut, and it is evident that the post and stem may be slid in on the slotted lever toward its center of rotation, and there, in adjusted position, held by the clamp nut or socket nut beneath the slotted lever.

Claims:

1. The combination with a slotted index head, of a perforated index plate secured thereto, a lever revoluble on said plate and provided with a pointer to engage the perforated plate, a blank-supporting mandrel, said plate having a lug with extension means adjustable in the slot of said head, and means operable through the lever for turning said mandrel to index the blank.

2. In an indexing device the combination with a bearing sleeve and worm shaft therein, of a perforated plate with a hub surrounding said sleeve, a lever with a sleeve to revolve said shaft, a pointer carried by the lever to engage perforations in the plate, and a mandrel for supporting a blank operated from said shaft, there being a screw on the shaft for operating the worm wheel on the mandrel.

3. In an indexing device the combination with a revoluble shaft and its bearing sleeve, of an index plate, an index lever having a sleeve over said shaft, a threaded extension on the shaft and a securing nut in the hub of the lever engaging said extension, and a pointer carried by said lever co-acting with the index plate.

In testimony whereof I affix my signature.

ROBERT E. GARRETT.